(12) United States Patent
Kemmerling et al.

(10) Patent No.: US 10,539,070 B2
(45) Date of Patent: Jan. 21, 2020

(54) SYSTEMS AND METHODS FOR A SUPERCHARGED INTERNAL COMBUSTION ENGINE WITH EXHAUST GAS RECIRCULATION

(71) Applicant: Ford Global Technologies, LLC, Dearborn, MI (US)

(72) Inventors: Joerg Kemmerling, Monschau (DE); Vanco Smiljanovski, Bedburg (DE); Helmut Matthias Kindl, Aachen (DE); Hanno Friederichs, Aachen (DE); Andreas Kuske, Geulle (NL); Franz Arnd Sommerhoff, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 16/007,459

(22) Filed: Jun. 13, 2018

(65) Prior Publication Data

US 2019/0003379 A1     Jan. 3, 2019

(30) Foreign Application Priority Data

Jun. 28, 2017  (DE) .................. 10 2017 210 962

(51) Int. Cl.
  *F02B 39/16*  (2006.01)
  *F02B 37/16*  (2006.01)
  (Continued)

(52) U.S. Cl.
  CPC .............. *F02B 39/16* (2013.01); *F02B 37/04* (2013.01); *F02B 37/16* (2013.01); *F02B 37/162* (2019.05);
  (Continued)

(58) Field of Classification Search
  CPC ...... F01N 2340/06; F01N 3/021; F02B 37/04; F02B 37/16; F02B 37/162; F02B 39/10; F02B 39/16; F02M 26/08; F02M 26/09
  See application file for complete search history.

(56) References Cited

U.S. PATENT DOCUMENTS

| 5,771,868 A | * | 6/1998 | Khair ............... | F02B 33/32 |
| | | | | 123/568.12 |
| 6,062,026 A | * | 5/2000 | Woollenweber ....... | F02B 37/04 |
| | | | | 60/605.2 |

(Continued)

FOREIGN PATENT DOCUMENTS

| DE | 102013008827 A1 | 11/2014 |
| DE | 102014225887 A1 | 7/2015 |

(Continued)

OTHER PUBLICATIONS

Munz, S. et al., "Turbolcharger for Emission Concepts with Low-Pressure-End Exhaust-Gas Recirculation," BorgWarner Website, Available Online at: http://www.turbos.bwauto.com/tools/download.aspx?t=document&r=510&d=599.

(Continued)

*Primary Examiner* — Jesse S Bogue
(74) *Attorney, Agent, or Firm* — Geoffrey Brumbaugh; McCoy Russell LLP

(57) ABSTRACT

Methods and systems are provided for a supercharged internal combustion engine having staged boosting devices. In one example, a system may include an engine coupled to an intake system for receiving charge air and an exhaust system for discharging exhaust gases, an electrically driven compressor arranged in the intake system upstream of a turbocharger compressor, a bypass line, including a bypass valve, coupled across the electrically driven compressor, a throttle arranged at an inlet of the electrically driven compressor, and an exhaust gas recirculation system that couples the (Continued)

exhaust system downstream of the exhaust turbine to the intake system upstream of the electrically driven compressor via a first recirculation branch and between the electrically driven compressor and the turbocharger compressor via a second recirculation branch. In this way, the electrically driven compressor may be operated to reduce condensate formation at an inlet of the turbocharger compressor.

20 Claims, 4 Drawing Sheets

(51) Int. Cl.
  *F02M 26/08* (2016.01)
  *F02M 26/09* (2016.01)
  *F02B 37/04* (2006.01)
  *F02B 39/10* (2006.01)
  *F01N 3/021* (2006.01)

(52) U.S. Cl.
  CPC ............. *F02B 39/10* (2013.01); *F02M 26/08* (2016.02); *F02M 26/09* (2016.02); *F01N 3/021* (2013.01); *F01N 2340/06* (2013.01)

(56) References Cited

U.S. PATENT DOCUMENTS

| | | | |
|---|---|---|---|
| 6,907,867 B2 * | 6/2005 | Igarashi | F02B 29/04 123/564 |
| 7,469,691 B2 | 12/2008 | Joergl et al. | |
| 7,530,229 B2 * | 5/2009 | Akita | F02B 37/22 290/52 |
| 8,960,166 B2 | 2/2015 | Styles et al. | |
| 9,091,202 B2 * | 7/2015 | Styles | F02B 47/08 |
| 9,695,740 B2 * | 7/2017 | Xiao | F02B 37/14 |
| 9,903,320 B2 * | 2/2018 | Takasu | F02D 41/0065 |
| 10,024,255 B2 * | 7/2018 | Ulrey | F02M 26/04 |
| 10,125,727 B2 * | 11/2018 | Hayashi | F02D 41/0065 |
| 10,132,231 B2 * | 11/2018 | Iwamoto | F01D 15/10 |
| 10,132,235 B2 * | 11/2018 | Ulrey | F02M 26/14 |
| 10,145,315 B2 * | 12/2018 | Ulrey | F02M 26/53 |
| 10,161,332 B2 * | 12/2018 | Ulrey | F01N 3/021 |
| 2015/0083092 A1 | 3/2015 | Desai | |
| 2018/0094610 A1 * | 4/2018 | Quix | F02M 26/04 |
| 2018/0202349 A1 * | 7/2018 | Kindl | F02B 29/0475 |
| 2019/0153916 A1 * | 5/2019 | Kelly | F01M 5/021 |
| 2019/0271276 A1 * | 9/2019 | Fulton | F02D 41/064 |

FOREIGN PATENT DOCUMENTS

| | | |
|---|---|---|
| DE | 102015208685 A1 | 11/2016 |
| EP | 2995799 A1 | 3/2016 |
| FR | 2920478 A3 | 3/2009 |
| GB | 2540758 A | 2/2017 |
| JP | 2009115089 A | 5/2009 |
| WO | 2015092290 A1 | 6/2015 |

OTHER PUBLICATIONS

"Mix-Filter-Separate Highly Functional Modular System For Engines With Low Pressure EGR," Mann-Filter Website, Available Online at https://www.mann-filter.com/ru/mf-ua/news/newsdetail/?tx_ttnews%5Btt_news%5D=493&cHash=80438575aff0e5634d6e3179bbf3813a, Sep. 9, 2013, 2 pages.
Kindle, H. et al., "Systems and Method for Charge Air Cooler De-icing," U.S. Appl. No. 15/872,519, filed Jan. 16, 2018, 47 pages.
Fulton, B. et al., "System and Method for Starting an Engine," U.S. Appl. No. 15/912,395, filed Mar. 5, 2018, 78 pages.
Martz, J. et al., "Systems and Methods for Expediting Engine Warming," U.S. Appl. No. 16/001,742, filed Jun. 6, 2018, 58 pages.

* cited by examiner

SYSTEMS AND METHODS FOR A SUPERCHARGED INTERNAL COMBUSTION ENGINE WITH EXHAUST GAS RECIRCULATION

CROSS REFERENCE TO RELATED APPLICATION

This application claims priority to German Patent Application No. 102017210962.9, filed Jun. 28, 2017. The entire contents of the above-referenced application are hereby incorporated by reference in its entirety for all purposes.

FIELD

The present description relates generally to methods and systems for a supercharged internal combustion engine having staged boosting devices.

BACKGROUND/SUMMARY

An internal combustion engine may be used as a motor vehicle drive. The expression "internal combustion engine" encompasses diesel engines, Otto-cycle (e.g., sparking ignition) engines, and also hybrid internal combustion engines, which utilize a hybrid combustion process, and hybrid drives which comprise not only the internal combustion engine, but also an electric machine. The electric machine may be connected in terms of drive to the internal combustion engine and may receive power from the internal combustion engine or, as a switchable auxiliary drive, may additionally output power.

In recent years, there has been a trend in development toward supercharged engines, wherein the economic significance of said engines for the automobile construction industry continues to steadily increase. Supercharging is primarily a method for increasing power in which the air required for the combustion process in the engine is compressed, as a result of which a greater air mass can be fed to each cylinder in each working cycle. In this way, the fuel mass and therefore the mean pressure can be increased.

Supercharging is a suitable means for increasing the power of an internal combustion engine while maintaining an unchanged swept volume, or for reducing the swept volume while maintaining the same power. In all cases, supercharging leads to an increase in volumetric power output and a more expedient power-to-weight ratio. If the swept volume is reduced, it is thus possible to shift the load collective toward higher loads, at which the specific fuel consumption is lower. Supercharging consequently assists in the constant efforts in the development of internal combustion engines to minimize fuel consumption and increase the efficiency of the internal combustion engine.

By means of a suitable transmission configuration, it is additionally possible to realize so-called downspeeding, whereby a lower specific fuel consumption is likewise achieved. In the case of downspeeding, use is made of the fact that the specific fuel consumption at low engine speeds is generally lower, in particular in the presence of relatively high loads.

For supercharging, use is often made of an exhaust gas turbocharger, in which a compressor and a turbine are arranged on a same shaft. Hot exhaust gas flow is fed to the turbine and expands in the turbine with a release of energy, which rotates the shaft. The energy released by the exhaust gas flow to the turbine and ultimately to the shaft is used for driving the compressor, which is arranged in an intake system of the engine. The compressor conveys and compresses charge air fed to it, resulting in supercharging of the engine. A charge-air cooler is commonly provided in the intake system downstream of the compressor, by means of which the compressed charge air is cooled before it enters cylinders of the engine. The charge-air cooler lowers the temperature and thereby increases the density of the charge air, such that the charge-air cooler also contributes to increased charging of the cylinders (e.g., with a greater air mass), such as through compression by cooling.

An advantage of an exhaust gas turbocharger in relation to a supercharger, which can be driven by means of an auxiliary drive, is that an exhaust gas turbocharger utilizes the exhaust gas energy of the hot exhaust gases, whereas a supercharger draws the energy required for driving it directly or indirectly from the internal combustion engine and thus reduces the engine efficiency, at least for as long as the drive energy does not originate from an energy recovery source. If the supercharger is not one that can be driven by means of an electric machine (e.g., electrically) a mechanical or kinematic connection for power transmission is generally required between the supercharger and the internal combustion engine, which also influences packaging of the engine system.

An advantage of a supercharger in relation to an exhaust gas turbocharger is that the supercharger can generate, and make available, a desired charge pressure at all times, specifically regardless of the operating state of the internal combustion engine. This applies in particular to a supercharger which can be driven electrically by means of an electric machine, and is therefore independent of the rotational speed of the crankshaft.

In some internal combustion engine systems, one or more intake charging devices may be staged in series or parallel in what may be referred to as a compound boosting configuration. For example, a fast, auxiliary boosting device (e.g., an electric supercharger, or e-booster) may be utilized to increase the transient performance of a slower, primary boosting device (e.g., the exhaust gas turbocharger). As a result, an increase in power may be achieved in all engine speed ranges.

With targeted configuration of the supercharging, it is possible to not only reduce fuel consumption and increase the efficiency of the internal combustion engine, but also reduce exhaust gas emissions. To be able to adhere to future limit values for pollutant emissions, however, further measures are necessary in addition to the supercharging system. As one example, the reduction of nitrogen oxide emissions is of high relevance in particular in diesel engines. Since the formation of nitrogen oxides requires not only an excess of air but rather also high temperatures, one concept for lowering the nitrogen oxide emissions includes developing combustion processes with low combustion temperatures.

As one example, exhaust gas recirculation (EGR) may be used to reduce combustion temperatures, wherein it is possible for the nitrogen oxide emissions to be considerably reduced with increasing exhaust gas recirculation rate. Here, the exhaust gas recirculation rate $x_{EGR}$ is determined as $x_{EGR} = m_{EGR}/(m_{EGR} + m_{air})$, where $m_{EGR}$ denotes the mass of recirculated exhaust gas and $m_{air}$ denotes the supplied air. To obtain a considerable reduction in nitrogen oxide emissions, high exhaust gas recirculation rates may be used, which may be approximately $x_{EGR} \approx 60\%$ to 70% or more. Such high recirculation rates generally require cooling of the exhaust gas for recirculation.

For example, the internal combustion engine may include an exhaust gas recirculation system that recirculates exhaust gases from downstream of the turbocharger turbine to upstream of the turbocharger compressor via a recirculation line. Said exhaust gas recirculation system is consequently a low-pressure EGR system. In the recirculation line, there are generally provided a cooler and an EGR valve for setting the recirculated exhaust gas flow rate.

An advantage of low-pressure EGR compared with high-pressure EGR, in which the exhaust gas for recirculation is extracted from upstream of the turbine and is no longer available for driving the turbine, is that, regardless of the present recirculation rate, all of the exhaust gas from the internal combustion engine is available at the turbine. A reduced exhaust gas mass flow through the turbine specifically leads to a lower turbine pressure ratio and, thus, a lower charge pressure ratio, which equates to a smaller compressor mass flow. Therefore, the low-pressure EGR system avoids the smaller compressor mass flow.

The exhaust gas which is recirculated via the low-pressure EGR system to the intake system is mixed with fresh air upstream of the turbocharger compressor. The mixture of fresh air and recirculated exhaust gas produced in this way forms the charge air which is supplied to the compressor and compressed, which may be cooled, downstream of the compressor, in a charge-air cooler.

However, the inventors herein have recognized potential issues with such systems. As one example, condensate may form when the exhaust gas recirculation system is active and exhaust gas is introduced into the intake system upstream of the compressor. For example, condensate may form if recirculated hot exhaust gas meets, and is mixed with, cool fresh air. The exhaust gas cools down, whereas a temperature of the fresh air is increased. The temperature of the mixture of fresh air and recirculated exhaust gas, that is to say the charge-air temperature, lies below the exhaust gas temperature of the recirculated exhaust gas. During the course of the cooling of the exhaust gas, components previously contained in the exhaust gas still in gaseous form, such as water, may condense if the dew point temperature of a component of the gaseous charge-air flow is undershot. When condensate formation occurs in the charge-air flow, contaminants in the charge air often form a starting point for the formation of condensate droplets. As another example, condensate can form when hot exhaust gas and/or the charge air impinges on the internal wall of the intake system, as the wall temperature generally lies below the dew point temperature of the relevant gaseous components.

The problem of condensate formation is intensified with increasing recirculation rate because, with the increase of the recirculated exhaust gas flow rate, the fractions of the individual exhaust gas components in the charge air, in particular the fraction of the water contained in the exhaust gas, inevitably increase. In the prior art, therefore, the exhaust gas flow rate recirculated via the low-pressure EGR system is commonly limited in order to prevent or reduce the occurrence of condensation. The required limitation of the low-pressure EGR on the one hand and the high exhaust gas recirculation rates required for a considerable reduction in the nitrogen oxide emissions on the other hand conflict, resulting in reduced reduction of the nitrogen oxide emissions. The problem of condensate formation is also intensified with decreasing ambient temperature because, with the decrease in ambient temperature, the charge-air temperature, that is to say the temperature of the mixture of fresh air and recirculated exhaust gas, decreases, a result of which the charge air can in particular absorb less gaseous water. Here, the recirculated exhaust gas is more intensely cooled.

Condensate and condensate droplets are undesirable and lead to increased noise emissions in the intake system and may degrade the turbocharger compressor. The latter effect is associated with a reduction in efficiency of the compressor.

In one example, the issues described above may be addressed by a system for a supercharged internal combustion engine, comprising: an intake system for the supply of charge air; an exhaust gas discharge system for the discharge of exhaust gas; a turbocharger, including a turbine arranged in the exhaust gas discharge system and a compressor arranged in the intake system; an electrically drivable compressor arranged in the intake system upstream of the compressor of the turbocharger; a compressor-specific throttle element is arranged upstream of the electrically drivable compressor; a bypass line for bypassing said electrically drivable compressor that branches off from the intake system upstream of the electrically drivable compressor, forming a third junction, and opens into the intake system between the electrically drivable compressor and the compressor of the turbocharger, forming a fourth junction; a shut-off element arranged in the bypass line; and an exhaust gas recirculation system, comprising a recirculation line which branches off from the exhaust gas discharge system downstream of the turbine of the turbocharger, the recirculation line bifurcating into a first recirculation branch that includes a first EGR valve and opens into the intake system upstream of the third junction, forming a first junction, and a second recirculation branch that includes a second EGR valve and opens into the intake system between the fourth junction and the compressor of the turbocharger, forming a second junction. In this way, the electrically drivable compressor may be used for heating the fresh air drawn in via the intake system in order to counteract the formation of condensate during the introduction of recirculated exhaust gas.

As one example, the fresh air may be throttled using the throttle element upstream of the electrically drivable compressor. Here, the pressure in the fresh air falls, whereas the temperature in the fresh air remains virtually unchanged. During the subsequent compression in the electrically driven compressor arranged downstream of the throttle element, the pressure in the fresh air is then increased again, and the temperature of the fresh air increases. Fresh air at an elevated temperature is then present downstream of the electrically drivable compressor. If exhaust gas is now introduced into said heated or warmer fresh air, a higher charge-air temperature inevitably also results. For example, the temperature of the mixture of fresh air and recirculated exhaust gas is likewise higher, whereby the charge air can absorb more gaseous water. The recirculated exhaust gas is less intensely cooled, whereby the formation of condensate in the charge-air flow is counteracted. The condensate formation as a result of wall contact is likewise counteracted because the heated fresh air heats the walls of the intake system downstream of the electrically driven compressor. As another example, the exhaust gas recirculation system according to the present disclosure may be used during conditions that would otherwise cause condensate formation, for example, after a cold start or in the presence of low ambient temperatures. In this way, the exhaust gas recirculation system may be used in an extended temperature range, increasing fuel economy and reducing vehicle emissions, while degradation of the turbocharger compressor is prevented.

As another example, if relevant condensate formation is not to be expected, with the throttle element open, the electrically drivable compressor may be actively operated and utilized for generating charge pressure, for example, in order to increase transient operating characteristics of the internal combustion engine. In such an example, exhaust gas recirculation may be provided upstream of the electrically drivable compressor via the first recirculation branch.

The heating of the fresh air according to the present disclosure has further advantageous effects. The heated charge air or fresh air assists the warm-up process of the internal combustion engine, in particular after a cold start, for example by means of an introduction of heat into the walls of the intake system and the combustion chamber walls of the cylinders. Owing to the higher temperature level, the untreated emissions of unburned hydrocarbons and carbon monoxide may decrease.

According to the present disclosure, the electrically drivable compressor is designed as an activatable compressor, which is activated when required. In addition to the use described above, the electrically drivable compressor can, in principle, be used whenever there is a need, including, for example, to assist the exhaust gas turbocharger in compressing the charge air. The electrically drivable compressor may also be used to generate the charge pressure instead of the exhaust gas turbocharger, such as during low loads or during low charge-air flow rates.

According to the present disclosure, the electrically drivable compressor does not necessarily have to be switched off after the heating of the fresh air. The electrically drivable compressor may thus continue to be operated even if no condensate formation is to be expected.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
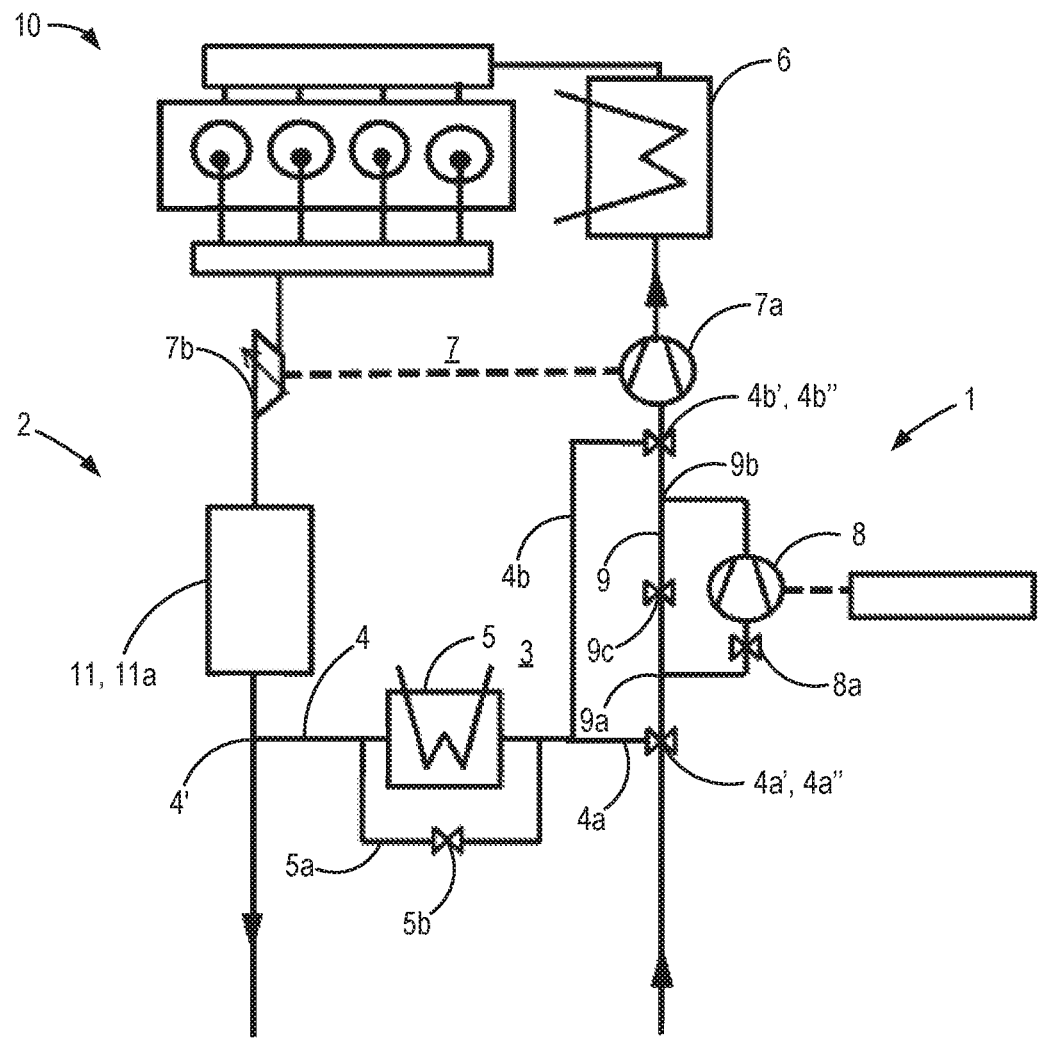
FIG. 1 schematically shows a first embodiment of an internal combustion engine.
Figure 2:
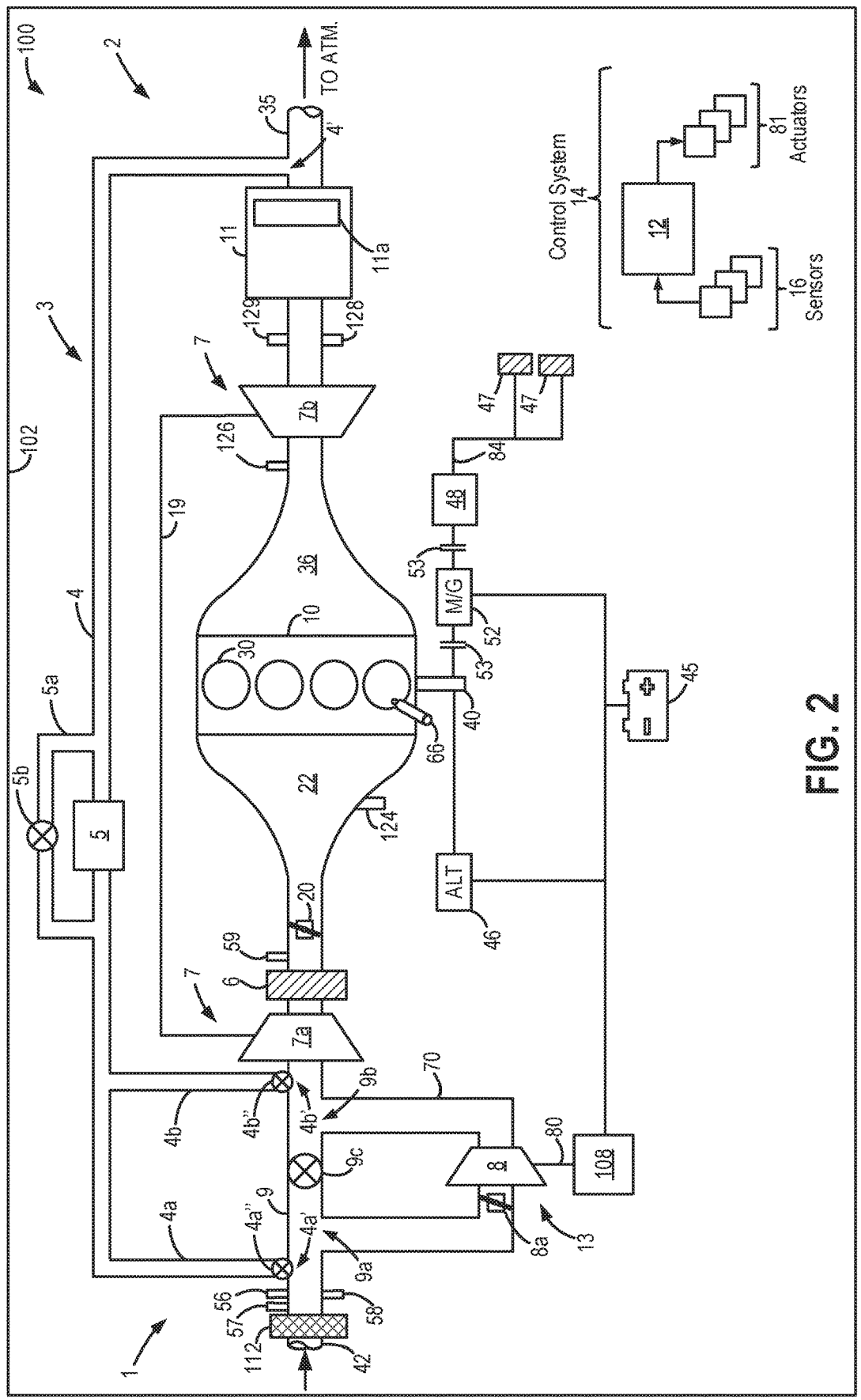
FIG. 2 shows a schematic depiction of an example vehicle system that includes multiple staged boosting devices.
Figure 3:
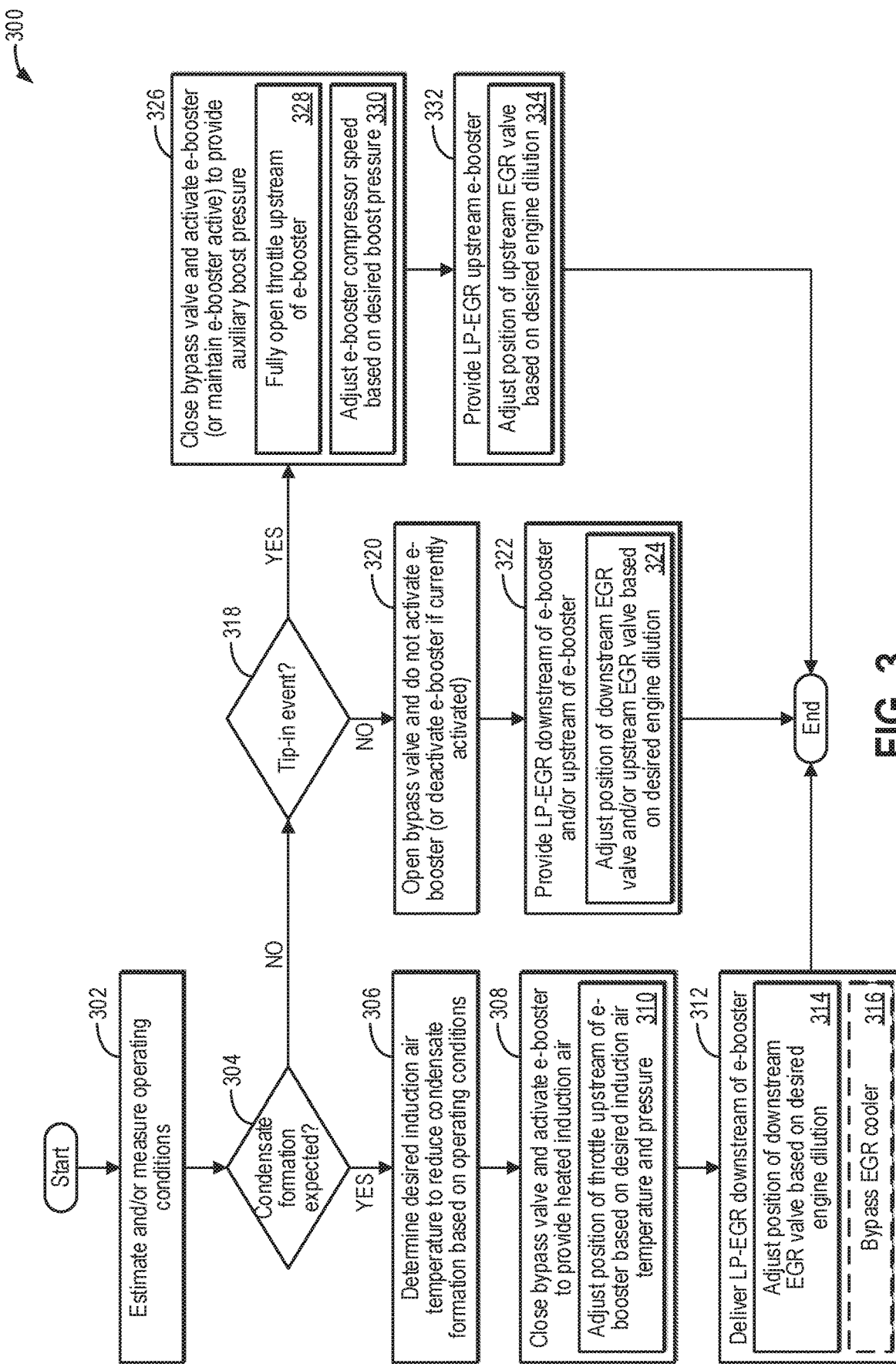
FIG. 3 is a flow chart for controlling an electrically drivable compressor and a low-pressure exhaust gas recirculation system.
Figure 4:
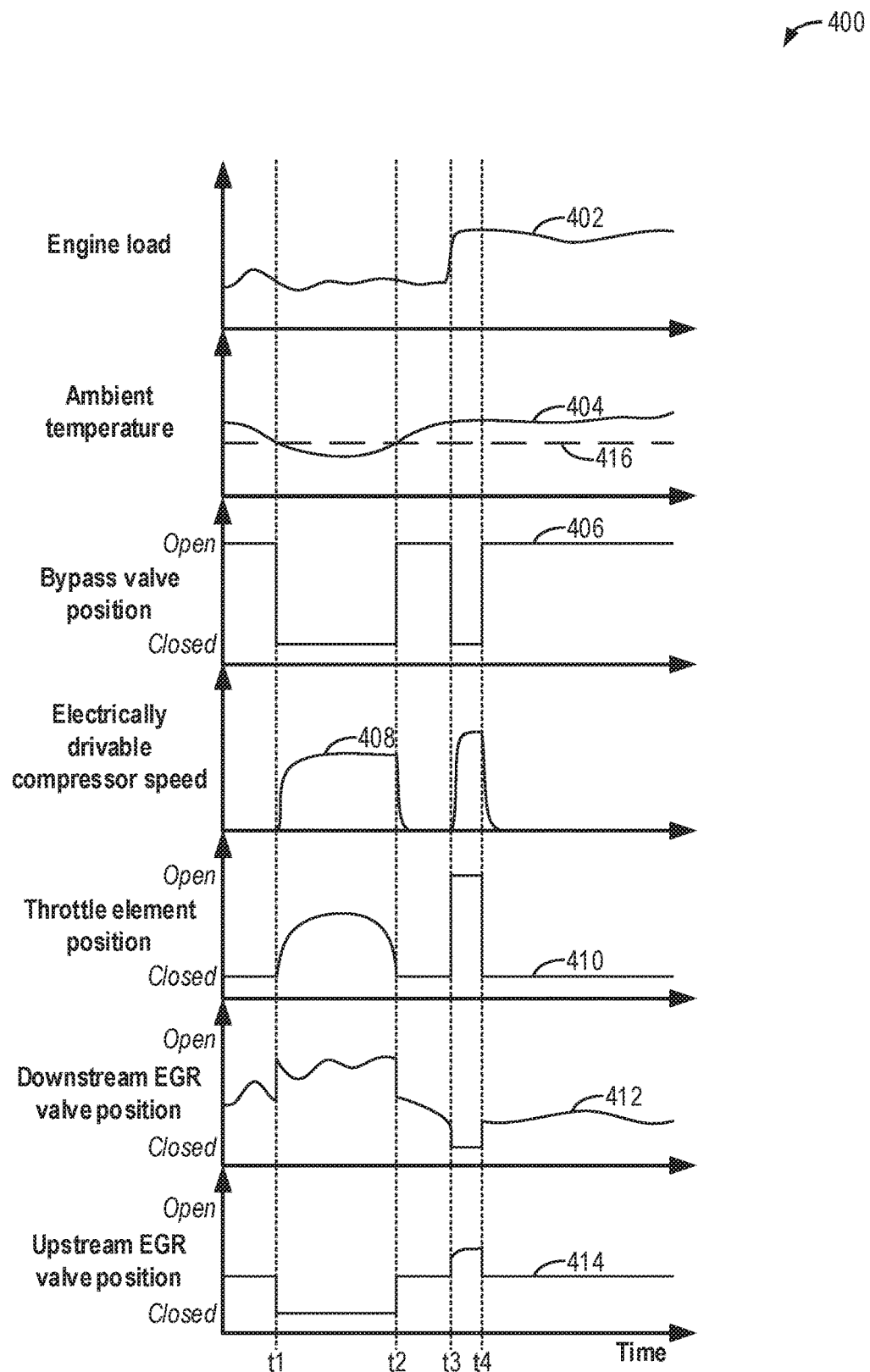
FIG. 4 is a prophetic example timeline for adjusting operation of an electrically drivable compressor and a low-pressure exhaust gas recirculation system based on operating conditions.

The following description relates to systems and methods for a supercharged internal combustion engine having staged boosting devices. One non-limiting example of such a boosted engine system is shown in FIGS. 1 and 2, wherein a turbocharger is staged downstream of an electrically drivable compressor (e.g., an e-booster or e-compressor). The electrically drivable compressor may be operated to provide heated intake air to an inlet of a compressor of the turbocharger or provide boost pressure, such as according to the example method of FIG. 3. The engine system further includes a low-pressure exhaust gas recirculation (LP-EGR) system, which may provide EGR upstream of the electrically drivable compressor, downstream of the electrically drivable compressor (and upstream of a compressor of the turbocharger), or both, with the location selected based on operating conditions, as also shown in FIG. 3. An example timeline for adjusting operation of the electrically drivable compressor and the LP-EGR system based on operating conditions is shown in FIG. 4.

FIG. 1 schematically shows a first embodiment of a supercharged internal combustion engine 10, which is equipped with an exhaust gas turbocharger 7, which comprises a turbine 7b arranged in an exhaust gas discharge system 2 and a compressor 7a arranged in an intake system 1. Components of the exhaust gas discharge system 2, the intake system 1, and the internal combustion engine 10 will be elaborated below with respect to FIG. 2. Hot exhaust gas expands in the turbine 7b with a release of energy, and drives the compressor 7a. The compressor 7a compresses charge air, which is supplied to cylinders of the internal combustion engine 10 via the intake system 1 and a charge-air cooler 6 provided downstream, resulting in supercharging of the internal combustion engine 10. Said internal combustion engine is a four-cylinder in-line engine 10 in which the four cylinders are arranged along the longitudinal axis of the cylinder head, that is to say in a line, in the example embodiment of FIG. 1.

Arranged in the intake system 1 upstream of the compressor 7a of the exhaust gas turbocharger 7 is an electrically drivable compressor 8, which can be activated to assist the compressor 7a of the exhaust gas turbocharger 7 in order to supply the cylinders with sufficient charge air, as will be elaborated below with respect to FIGS. 2 and 3. A bypass line 9 is provided for the purposes of bypassing the electrically drivable compressor 8, which bypass line branches off, with the formation of a third junction 9a, from the intake system 1 upstream of the electrically drivable compressor 8 and opens into the intake system 1, with the formation of a fourth junction 9b, between the electrically drivable compressor 8 and the compressor 7a of the exhaust gas turbocharger 7. In the bypass line 9, there is provided a shut-off element 9c for opening up and blocking the bypass line 9.

The internal combustion engine 10 is also equipped with a low-pressure exhaust gas recirculation (LP-EGR) system 3. The low-pressure EGR system 3 comprises a recirculation line 4 which branches off, with the formation of a junction 4', from the exhaust gas discharge system 2 downstream of the turbine 7b of the exhaust gas turbocharger 7 and by means of which the exhaust gas can be introduced into the intake system 1 upstream of the compressor 7a of the exhaust gas turbocharger 7.

The recirculation line 4 bifurcates into a first recirculation branch 4a that opens into the intake system 1 with the formation of a first junction 4a', upstream of the third junction 9a, and a second recirculation branch 4b that opens into the intake system 1 with the formation of a second junction 4b', between the fourth junction 9b and the compressor 7a of the exhaust gas turbocharger 7. Each recirculation branch 4a and 4b is equipped with a dedicated EGR valve 4a" and 4b", respectively, for setting a recirculated exhaust gas flow rate, the EGR valves 4a" and 4b" being arranged, as per FIG. 1, at the associated junctions 4a' and 4b', respectively, and thus downstream of a cooler 5 arranged in the recirculation line 4. A bypass line 5a serves for bypassing the cooler 5. A shut-off element 5b arranged in the bypass line 5a serves for opening up and shutting off the bypass line 5a.

The exhaust gas that flows through the turbine 7b is subjected, upstream of the LP-EGR system 3 and downstream of the turbine 7b, to exhaust gas after-treatment in an exhaust gas after-treatment system 11. In the present example, the exhaust gas after-treatment system 11 is shown including after-treatment particle filter 11a.

The electrically drivable compressor 8 may be used for heating fresh air situated in the intake system 1 in order to counteract (or reduce) the formation of condensate during the introduction of recirculated exhaust gas via the second recirculation branch 4b, as will be described below with respect to FIG. 3. A throttle element 8a arranged upstream of the electrically drivable compressor 8 serves for throttling the fresh air flow, such as for reducing pressure in the fresh-air flow. Here, the pressure in the fresh air falls, preferably in isothermic fashion, such that the temperature in the fresh air remains virtually unchanged. During the subsequent compression in the electrically driven compressor 8 arranged downstream, the pressure in the fresh air is then increased again, such as to atmospheric pressure ($p_{atm}$) upstream of the throttle element 8a. During the compression, the temperature of the fresh air is likewise increased, such that fresh air at an elevated temperature is provided downstream of the electrically drivable compressor 8. As a result, the condensate formation during the introduction of exhaust gas via the second recirculation branch 4b into the heated fresh air is counteracted.

FIG. 2 schematically shows aspects of an example engine system 100, including the internal combustion engine 10 introduced in FIG. 1, coupled in a vehicle 102. Components of FIG. 2 that are the same as components introduced in FIG. 1 are numbered the same and may not be reintroduced. In some examples, vehicle 102 may be a hybrid vehicle with multiple sources of torque available to one or more vehicle wheels 47. In other examples, vehicle 102 is a conventional vehicle with only an engine. In the example shown, a powertrain of vehicle 102 includes engine 10 and an electric machine 52. Electric machine 52 may be a motor or a motor/generator. Engine 10 and electric machine 52 are connected to vehicle wheels 47 via a transmission 48 when one or more clutches 53 are engaged. In the depicted example, a (first) clutch 53 is provided between engine 10 and electric machine 52, and a (second) clutch 53 is provided between electric machine 52 and transmission 48. A controller 12 may send a signal to an actuator of each clutch 53 to engage or disengage the clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 47 via a crankshaft 40, transmission 48, and a powertrain shaft 84 when clutches 53 are engaged. Transmission 48 may be a gearbox, a planetary gear system, or another type of transmission. Transmission 48 may be a fixed ratio transmission that includes a plurality of gear ratios to allow engine 10 to rotate at a different speed than wheels 47. By changing a torque transfer capacity of first clutch 53 (e.g., an amount of clutch slippage), an amount of engine torque relayed to the wheels via powertrain shaft 84 may be modulated.

The powertrain may be configured in various manners, including as a parallel, a series, or a series-parallel hybrid vehicle. In electric vehicle embodiments, a system battery 45 may be a traction battery that delivers electrical power to electric machine 52 to provide torque to vehicle wheels 47. In some embodiments, electric machine 52 may also be operated as a generator to provide electrical power to charge system battery 45, for example, during a braking operation. It will be appreciated that in other embodiments, including non-electric vehicle embodiments, system battery 45 may be a typical starting, lighting, ignition (SLI) battery coupled to an alternator 46. Alternator 46 may be configured to charge system battery 45 using engine torque drawn from the crankshaft during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

In the depicted example, engine 10 is a boosted engine configured with staged boosting devices. Specifically, engine 10 includes a first boosting device staged upstream of a second boosting device. Herein, the first boosting device is an electric supercharger or e-booster 13, and the second boosting device is the turbocharger 7, although other configurations are possible. As an example, the e-booster 13 may be an auxiliary boosting device, whereas the turbocharger 7 may be a primary boosting device. Compressor 7a of the turbocharger 7 is shown coupled to an intake passage 42 and mechanically coupled to the turbine 7b via a shaft 19, the turbine 7b coupled to an exhaust passage 35 and driven by expanding engine exhaust. In one example, the turbocharger may be a twin scroll device. In another example, the turbocharger may include a variable geometry turbine (VGT), wherein turbine geometry is actively varied as a function of engine operating conditions. The e-booster 13 includes an electric motor 108 for driving the electrically drivable compressor 8 via a shaft 80. Electric motor 108 may be powered by an on-board energy storage device, such as system battery 45. Electric motor 108 may be additionally or alternatively powered by alternator 46. An amount of electrical power delivered to electric motor 108 may be varied in order to adjust a duty cycle of the e-booster. In one example, the amount of electric power delivered to electric motor 108 may be increased to increase the speed of the electrically drivable compressor 8, with a corresponding increase in the electrical load applied on the alternator and a decrease in alternator current. As a result of the electrical assistance, the electrically drivable compressor 8 may be rapidly spun up, providing for a fast-acting or high frequency boost actuation and on-demand intake air heating.

However, other combinations and configurations of boosting devices may be possible without departing from the scope of this disclosure. For example, in alternative examples, turbocharger 7 may be an electric turbocharger having an electric motor coupled to the compressor, turbine, or turbocharger shaft, or may be an electrical or mechanical supercharger. In still other examples, additional boosting devices may be present, such as two turbochargers staged in series, two turbochargers staged in parallel, or any combination of turbochargers and superchargers. Furthermore, in some examples, compressor 7a may be a radial compressor. In other examples, compressor 7a may be an axial compressor.

Fresh air is introduced into the intake system 1 along intake passage 42 via an air box 112 and flows to the electrically drivable compressor 8 and/or compressor 7a of the turbocharger 7. For example, during selected conditions, such as elaborated below with respect to FIG. 3, controller 12 may fully close throttle element 8a while fully opening shut-off element 9c so that fresh air flows to an inlet of the compressor 7a via the bypass line 9 without having flowed through the electrically drivable compressor 8. During other conditions, as also elaborated below with respect to FIG. 3, controller 12 may fully close shut-off element 9c and at least partially open throttle element 8a so that fresh air flows through the electrically drivable compressor 8 before reaching the inlet of the compressor 7a via a passage 70. As an example, the controller may deliver fresh air via passage 70 and the electrically drivable compressor 8 when heating of the fresh air is indicated, such as to reduce condensate formation. As another example, the controller may deliver fresh air via passage 70 and the electrically drivable compressor 8 to rapidly increase an amount of boost provided to the internal combustion engine 10.

In some examples, compressor 7a is coupled to a throttle 20 through the charge-air cooler (CAC) 6 (also referred to as an intercooler). Air flows from compressor 7a through CAC 6 and throttle 20 to an intake manifold 22. CAC 6 may be an air-to-air or water-to-air heat exchanger, for example. Intake manifold pressure (e.g., a pressure of the air charge within the intake manifold) may be determined using a manifold absolute pressure (MAP) sensor 124.

Intake manifold 22 is coupled to a series of combustion chambers (or cylinders) 30 through a series of intake valves (not shown). The combustion chambers are further coupled to an exhaust manifold 36 of the exhaust gas discharge system 2 via a series of exhaust valves (not shown). In the depicted example, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one example, each of the exhaust and intake valves may be electronically actuated or controlled. In another example, each of the exhaust and intake valves may be cam actuated or controlled. Whether electronically actuated or cam actuated, the timing of exhaust and intake valve opening and closure may be adjusted for a desired combustion and emissions control performance. For example, the cam timing may be adjusted via a variable cam timing system to move the intake and exhaust cams to a position that provides an optimal volumetric efficiency for the given operating conditions.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the depicted example, fuel is provided to each combustion chamber 30 via direct injection by a fuel injector 66 (while only one fuel injector is shown in FIG. 2, each combustion chamber includes a fuel injector coupled thereto). Fuel may be delivered to fuel injector 66 by a fuel system (not shown) including a fuel tank, a fuel pump, and a fuel rail. In the combustion chambers, combustion may be initiated via spark ignition and/or compression ignition.

As shown in FIG. 2, exhaust from exhaust manifold 36 is directed to turbine 7b to drive the turbine. When reduced turbine torque is desired, in examples where turbine 7b is a variable geometry turbine, turbine vanes may be varied to reduce exhaust pressure upstream of turbine 7b, thereby reducing a speed of turbine 7b. When increased turbine torque is desire, the turbine vanes may be varied to increase exhaust pressure upstream of turbine 7b, thereby increasing a speed of turbine 7b. As an example, the turbine vanes may be coupled to an annular ring, and the ring may be rotated to adjust a position of the turbine vanes. In another example, one or more of the turbine vanes may be pivoted individually or pivoted in plurality. Adjusting the position of the turbine vanes may adjust a cross-sectional opening (or area) of turbine 7b. As another example, turbine 7b may include a wastegate, and a portion of exhaust may be directed instead through the wastegate, bypassing the turbine, to reduce the turbine speed. For example, a wastegate actuator (e.g., a wastegate valve) may be actuated open to relieve at least some exhaust pressure from upstream of turbine 7b to a location downstream of turbine 7b via the wastegate to reduce the turbine speed.

The exhaust flow from turbine 7b flows through an exhaust gas after-treatment system 11. In general, exhaust gas after-treatment system 11 may include one or more exhaust after-treatment components configured to reduce an amount of one or more substances in the exhaust flow. For example, one exhaust after-treatment component may be configured to trap $NO_x$ from the exhaust flow when the exhaust flow is lean and to reduce the trapped $NO_x$ when the exhaust flow is rich. In other examples, an exhaust after-treatment component may be configured to disproportionate $NO_x$ or to selectively reduce $NO_x$ with the aid of a reducing agent. In still other examples, exhaust gas after-treatment system 11 includes a three-way catalyst configured to oxidize residual hydrocarbons and carbon monoxide while reducing $NO_x$ in the exhaust flow. Different exhaust after-treatment catalysts having any such functionality may be arranged in wash coats or elsewhere in exhaust gas after-treatment system 11, either separately or together. Further, exhaust gas after-treatment system 11 is shown including particle filter 11a for removing particulate matter from the exhaust gas. As an example, particle filter 11a may be a regeneratable soot filter configured to trap and oxidize soot particles in the exhaust flow.

All or part of the treated exhaust from exhaust gas after-treatment system 11 may be released into the atmosphere via exhaust passage 35. Depending on operating conditions, however, some exhaust may be diverted instead to intake passage 42 via the LP-EGR system 3. In other examples, a high-pressure (HP) EGR system may additionally or alternatively be included. Exhaust gas is routed through recirculation line 4 from downstream of turbine 7b (via junction 4') to upstream of compressor 7a. The exhaust gas that is delivered upstream of compressor 7a may be delivered upstream of the electrically drivable compressor 8 (e.g., via first recirculation branch 4a and first junction 4a') and/or downstream of the electrically drivable compressor 8 (e.g., via second recirculation branch 4b and second junction 4b'), with the position selected based on operating conditions (as further elaborated below with respect to FIG. 3). The amount EGR provided to intake passage 42 upstream of compressor 7a may be varied by controller 12 via EGR valve 4a" and/or EGR valve 4b". In some examples, the cooler 5 may reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within recirculation line 4 and may provide an indication of one or more of mass flow, pressure, humidity, and temperature of the exhaust gas, for example.

One or more sensors may be coupled to intake passage 42 upstream of compressor 7a for determining a composition and condition of charge air entering the compressor. For example, an ambient pressure sensor 56 may be coupled to intake passage 42 upstream of compressor 7a and electrically drivable compressor 8 for estimating a pressure of air entering the compressors. Still other sensors may include, for example, air-fuel ratio sensors, a humidity sensor 58, etc. The sensors may estimate a condition of the intake air received at the compressor inlets from the intake passage. Although humidity sensor 58 is shown positioned to measure the humidity of the fresh intake air, in other examples, humidity sensor 58 may be positioned to additionally or alternatively measure the humidity of the recirculated exhaust gas. In addition, a throttle inlet pressure (TIP) sensor 59 may be coupled downstream of CAC 6 and upstream of throttle 20 for estimating a boost pressure delivered to the engine.

During an operator tip-in event, or when going from engine operation without boost to engine operation with boost responsive to an increase in operator torque demand, turbo lag can occur. This is due to delays in turbine 7b spin-up due to the turbocharger being a slower-acting compression device, and a momentary reduction in flow through compressor 7a when throttle valve 20 opens at the tip-in. The same may also occur when the engine is operating boosted and there is a transient increase in boost demand due to an increase in accelerator pedal application by the vehicle operator. Specifically, responsive to the tip-in, additional air flow can be transiently provided via e-booster 13, such as by fully closing shut-off element 9c within bypass line 9, fully opening throttle element 8a, and supplying electrical power to activate electric motor 108 and spin up the electrically drivable compressor 8. The additional compressed air, which is provided to compressor 7a via passage 70 and fourth junction 9b, increases an amount of boost provided to internal combustion engine 10. When the turbine has sufficiently spun up and the turbocharger 7 is capable of providing the requested amount of boost, shut-off element 9c may be fully opened, throttle element 8a may be fully closed, and electric power 108 may be deactivated (e.g., unpowered) so that additional compressed air is no longer provided by e-booster 13.

Controller 12 may be included in a control system 14. Controller 12 is shown receiving information from a plurality of sensors 16 (various examples of which are described herein) and sending control signals to a plurality of actuators 81 (various examples of which are described herein). As one example, sensors 16 may include an exhaust gas sensor 126 located upstream of turbine 7b, MAP sensor 124, an exhaust temperature sensor 128, an exhaust pressure sensor 129, ambient pressure sensor 56, an ambient temperature sensor 57, and TIP sensor 59. Other sensors, such as additional pressure, temperature, air/fuel ratio, and composition sensors, may be coupled to various locations in engine system 100. The actuators 81 may include, for example, throttle 20, shut-off element 9c, EGR valve 4a", EGR valve 4b", throttle element 8a, electric motor 108, and fuel injector 66. Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as example control routines described herein with regard to FIG. 3. As an example, controller 12 may actuate shut-off element 9c to a fully closed position and adjust a position of throttle element 8a while actuating electric motor 108 to operate e-booster 13 in response to an ambient temperature measured by ambient temperature sensor 57 and a humidity measured by humidity sensor 58.

Therefore, the system of FIGS. 1 and 2 provide for embodiments of the supercharged internal combustion engine in which the compressor-specific throttle element is arranged between the first junction and the electrically drivable compressor. In this way, if the compressor-specific throttle element is utilized for dissipating pressure, the electrically drivable compressor serves for heating the fresh air, and exhaust gas is recirculated into the intake system via the second recirculation branch. It is then not detrimental that the compressor-specific throttle element is arranged downstream of the first junction and thus increases the pressure upstream in the intake system (and thus also at the first junction).

In an alternative embodiment, the compressor-specific throttle element may be arranged upstream of the first junction. In such an example, a pressure gradient between the exhaust gas discharge system and the intake system may be generated, which may serve to increase or set a driving pressure gradient of the exhaust gas recirculation system via the first recirculation branch. In another alternative embodiment of the supercharged internal combustion engine, the compressor-specific throttle element may be arranged between the third junction and the electrically drivable compressor.

Embodiments of the supercharged internal combustion engine are provided in which the compressor-specific throttle element is a pivotable flap. As a throttle element, use may be made of a commercially available throttle flap, such as is already available on the market.

Embodiments of the supercharged internal combustion engine are provided in which at least one cooler is provided in the recirculation line. To realize a considerable reduction in nitrogen oxide emissions, high exhaust gas recirculation rates may be used, and cooling of the exhaust gas recirculation may be desired in order to reduce charge air temperatures. During the cooling process that takes place in the cooler, components such as water that are contained in gaseous form in the exhaust gas may already condense out and collect as liquids in the cooler. The condensate that is separated in the cooler can, a priori, no longer condense out downstream and lead to potential turbocharger compressor degradation. By using the cooler, the temperature of the exhaust gas for recirculation is lowered, whereby the temperature difference between the exhaust gas for recirculation and the fresh air is reduced. In this way, the formation of condensate during the mixing of the fresh air with the recirculated exhaust gas is reduced because the charge-air temperature of the mixture lies only insignificantly below the exhaust gas temperature of the recirculated exhaust gas, if at all. Then, noticeably less water, or no water, condenses during the cooling of the exhaust gas in the intake system.

In this context, embodiments of the supercharged internal combustion engine are provided in which the EGR valves are arranged downstream of the at least one cooler. Then, when the exhaust gas recirculation system is inactive, no fresh air originating from the intake system can pass into the cooler, which in the present example may remain charged with hot exhaust gas. The closed EGR valves serve as a barrier against the ingress of fresh air, wherein, owing to the system of the EGR valve downstream of the cooler, the cooler remains connected to the exhaust gas discharge system even when exhaust gas is not recirculated to the intake system. The fact that the cooler and the recirculation line upstream of the EGR valve remain charged with hot exhaust gas causes said part of the exhaust gas recirculation system to heat up, whereby condensate formation as a result of wall contact is counteracted. Furthermore, evaporation of previously formed condensate may be promoted due to the hot LP-EGR system. For this reason, in the present context, embodiments of the supercharged internal combustion engine are also provided in which the EGR valves are arranged at the associated junctions. Then, the entire recirculation line, together with recirculation branches as far as the intake-side junctions, remains charged with hot exhaust gas and heated by said exhaust gas.

Embodiments of the supercharged internal combustion engine are provided in which a bypass line for the at least one cooler is included. In individual situations, it may be desired not to cool the recirculated exhaust gas, for example, after a cold start of the internal combustion engine or during engine braking operation, in which preferably hot exhaust gas is supplied to the cylinders. Therefore, the exhaust gas for recirculation may bypass the cooler via the bypass line and an open shut-off element within the bypass line.

In some embodiments, at least one of the EGR valves is a pivotable flap. If the flap is arranged in a suitable manner, it may serve both for setting the exhaust gas flow rate recirculated via the exhaust gas recirculation system and for setting the fresh air flow rate supplied via the intake system, possibly in interaction with other components. For example, the flap may be pivotable about a spindle running transversely with respect to the fresh air flow, in such a way that, in a first end position, a front side of the flap blocks the intake system, and at the same time, the recirculation line is opened up; and, in a second end position, a back side of the flap covers the recirculation line, and at the same time, the intake system is opened up. In the above context, both "blocking" and "covering" do not imperatively also mean "closing" or completely blocking and covering.

Embodiments of the supercharged internal combustion engine are provided in which at least one exhaust gas after-treatment system is arranged in the exhaust gas discharge system between the turbine of the at least one exhaust gas turbocharger and the junction. For example, it the exhaust gas for recirculation may be subjected to exhaust gas after-treatment, in particular to a particle filter, before being recirculated to the compressor of the at least one exhaust gas turbocharger. In this way, deposits in the compressor, which change the geometry of the compressor, in particular the flow cross sections, and degrade the efficiency of the compressor may be reduced. In this context, embodiments of the supercharged internal combustion engine are provided in which a particle filter as exhaust gas after-treatment system is arranged in the exhaust gas discharge system between the turbine of the at least one exhaust gas turbocharger and the junction.

Embodiments of the supercharged internal combustion engine are provided in which a charge-air cooler is arranged in the intake system downstream of the compressor of the at least one exhaust gas turbocharger. The charge-air cooler lowers the temperature of the charge air and thereby increases the density of the charge air, such that increased charging of the cylinders is achieved (e.g., a greater air mass is supplied) compared with when the charge-air cooler is not used to lower the temperature of the charge air.

Next, FIG. 3 shows an example method 300 for operating an electrically drivable compressor of a supercharged internal combustion engine, such as electrically drivable compressor 8 of internal combustion engine 10 shown in FIGS. 1 and 2, while an EGR system is active (e.g., LP-EGR system 3 shown in FIGS. 1 and 2). The electrically drivable compressor and an electric motor for driving the electrically drivable compressor (e.g., electric motor 108 shown in FIG. 2) may be collectively referred to as an e-booster (e.g., e-booster 13 of FIG. 2). For example, under select conditions, the e-booster may be used for heating induction (e.g., intake) air to reduce condensate formation, and under other conditions, the e-booster may be used to provide boost pressure (e.g., additional boost pressure) to the engine. Furthermore, a position of EGR delivery by the LP-EGR system may be adjusted based on whether the e-booster is activated and used for induction air heating, activated and used for supplying boost pressure, or deactivated and not used for either induction air heating or supplying boost pressure. Instructions for carrying out method 300 and the rest of the methods included herein may be executed by a controller (e.g., controller 12 of FIG. 2) based on instructions stored on a memory of the controller and in conjunction with signals received from sensors of the engine system, such as the sensors described above with reference to FIG. 2 (e.g., temperature sensor 57 and humidity sensor 58). The controller may employ actuators of the engine system (e.g., shut-off element 9c, throttle element 8a, EGR valve 4a'', and EGR valve 4b'' of FIG. 2) to adjust engine operation according to the methods described below.

Method 300 begins at 302 and includes estimating and/or measuring operating conditions. Operating conditions may include engine speed, engine load, torque demand (e.g., as inferred from a position of an accelerator pedal), engine temperature (such as inferred from an engine coolant temperature measured by an engine coolant temperature sensor), intake manifold pressure (e.g., as measured by a MAP sensor, such as MAP sensor 124 of FIG. 2), ambient temperature (e.g., as measured by temperature sensor 57 of FIG. 2), ambient pressure (e.g., as measured by pressure sensor 56 of FIG. 2), ambient humidity (e.g., as measured by humidity sensor 58 of FIG. 2), a requested (e.g., desired) engine dilution (or EGR flow rate), a requested amount of boost, etc. The operating conditions may be measured or inferred based on available data.

At 304, method 300 includes determining if condensate formation is expected. As one example, the expected condensate formation may be expected condensate formation at an inlet of (e.g., upstream of) a turbocharger compressor (e.g., compressor 7a of FIGS. 1 and 2) positioned downstream of the e-booster. For example, the controller may make a determination of whether condensate formation is expected at the turbocharger compressor inlet based on the ambient temperature, the ambient humidity, and the requested engine dilution. Condensate may be expected to form at the turbocharger compressor inlet when fresh (cold) induction air is mixed with humid EGR gas upstream of the turbocharger compressor, for example. Therefore, the controller may input the ambient temperature, ambient humidity, and the requested engine dilution into one or more look-up tables, algorithms, or maps and output a determination of whether condensate formation is expected for the input conditions (e.g., yes or no). As another example, the controller may make a logical determination of whether condensate formation is expected using logic rules that are a function of the ambient temperature, the ambient humidity, and the desired engine dilution. As a further example, condensate formation may be expected when LP-EGR is requested and the ambient temperature is less than a threshold temperature. The threshold temperature may be a pre-calibrated temperature value below which condensate formation is known to occur and above which condensate formation is not expected to occur. The threshold temperature may be a positive, non-zero temperature value (such as 8° C., as one non-limiting example), a negative, non-zero temperature value (e.g., −8° C., as one non-limiting example), or equal to zero (e.g., 0° C.). In some examples, the threshold temperature may be adjusted based on one or more of the ambient humidity and the desired engine dilution.

If condensate formation is expected, method 300 proceeds to 306 and includes determining a desired induction air temperature to reduce condensate formation based on the operating conditions. The desired induction air temperature may be a desired temperature of air leaving the e-booster for preventing or counteracting condensate that may form when the air leaving the e-booster mixes with the LP-EGR stream upstream of the turbocharger compressor inlet. For example, the controller may input the ambient temperature, ambient humidity, and the requested engine dilution (e.g., desired LP-EGR flow amount or rate) into one or more look-up tables, algorithms, or maps and output the desired induction air temperature that will result in reduced condensate formation upstream of the turbocharger compressor for the input conditions. As an example, as the ambient temperature decreases, the ambient humidity increases, and/or the requested engine dilution increases, the desired induction temperature may increase.

At 308, method 300 includes closing a bypass valve and activating the e-booster to provide heated induction air. For example, the bypass valve may be a shut-off element positioned in a bypass line that bypasses the electrically drivable compressor (e.g., shut-off element 9c in bypass line 9). Therefore, method 300 at 308 may include fully closing the bypass valve so that induction air flows through the electrically drivable compressor, where it is heated via compression, before flowing to the inlet of the turbocharger compressor and not through the bypass line. Activating the e-booster includes operating the electrically drivable compressor at a non-zero desired speed via the electric motor using power drawn from a battery (e.g., system battery 45 of FIG. 2). An amount of power (or duty cycle of power) commanded to the electric motor may be based on the desired speed. As one example, the desired speed may be further based on the desired induction air temperature (e.g., as determined above at 306). For example, the controller may input the desired induction air temperature into a look-up table or function to determine the desired electrically drivable compressor speed. As another example, the desired speed may be a fixed, pre-calibrated speed for providing induction air heating that is stored in a memory of the controller. Whether determined based on the desired induction air temperature or fixed, the controller may input the desired electrically drivable compressor speed into an additional look-up table or function to output the corresponding amount of power (or duty cycle of power) to provide to the electric motor to produce the desired compressor speed.

Method 300 at 308 further includes adjusting a position of a throttle upstream of the e-booster based on a desired induction air temperature and pressure, as indicated at 310. Although activating the e-booster may increase the temperature of the intake air via compression, if airflow through the electrically drivable compressor is not regulated, the e-booster may also increase the pressure of the induction air, which may not be desired. Therefore, as one example, the controller may decrease an opening of the throttle (e.g., throttle element 8a of FIG. 2) by an amount that is proportional to a boost increase at the electrically drivable compressor that produces the desired induction air temperature. By throttling upstream of the electrically drivable compressor, the pressure at the inlet of the electrically drivable compressor may be reduced below ambient pressure, and the electrically drivable compressor may then increase the induction air pressure back to the ambient pressure (e.g., downstream of the electrically drivable compressor). As another example, when extra boost is demanded (e.g., greater than ambient pressure) based on operating conditions, the throttle opening may be decreased to a smaller degree. The controller may input the desired induction air temperature, ambient pressure, a desired induction air pressure, and the electrically drivable compressor speed into one or more look-up tables, maps, or functions and output the degree of opening of the throttle that will result in the desired induction air temperature and pressure. The controller may then generate a command signal that is sent to the throttle upstream of the e-booster to adjust the throttle to the determined degree of opening.

At 312, method 300 includes delivering LP-EGR downstream of the e-booster (and upstream of the turbocharger compressor). Delivering the LP-EGR downstream of the e-booster at 312 includes adjusting a position of a downstream EGR valve (e.g., EGR valve 4b" shown in FIGS. 1 and 2) based on a desired engine dilution, as indicated at 314. As an example, as the desired engine dilution increases, the opening of the downstream EGR valve may increase, and as the desired engine dilution decreases, the opening of the downstream EGR valve may decrease. Furthermore, an EGR valve positioned upstream of the e-booster (e.g., EGR valve 4a" shown in FIGS. 1 and 2) may be maintained fully closed while LP-EGR is provided downstream of the e-booster. The controller may determine the desired engine dilution based on operating conditions, including engine load, engine speed, engine temperature, etc. For example, the controller may refer a look-up table having the engine speed and load as the input and a signal corresponding to a degree of opening to apply to the downstream EGR valve as the output, the degree of opening providing a dilution amount corresponding to the input engine speed-load. In still other examples, the controller may rely on a model that correlates the change in engine load with a change in the desired engine dilution and further correlates the change in the desired engine dilution with a change in the downstream EGR valve position. For example, as engine load increases from a low load to a mid load, the desired engine dilution may increase, and a larger downstream EGR valve opening may be requested. Then, as engine load increases from a mid load to a high load, the desired engine dilution may decrease, and a smaller downstream EGR valve opening may be requested.

Furthermore, delivering the LP-EGR downstream of the e-booster at 312 optionally includes bypassing the EGR cooler, as indicated at 316. As an example, an EGR cooler (e.g., cooler 5 of FIGS. 1 and 2) may be bypassed during cold start and during braking, when the engine may benefit from EGR with an increased temperature. Bypassing the EGR cooler may include fully opening a shut-off element positioned in an EGR cooler bypass line (e.g., shut-off element 5b in bypass line 5a of FIGS. 1 and 2). Method 300 may then end.

Returning to 304, if condensate formation is not expected, method 300 proceeds to 318 and includes determining if a tip-in event is present. For example, it may be determined that a tip-in event is present if the torque demand has increased by more than a threshold amount and/or if the accelerator pedal has been depressed by more than a threshold amount from an un-depressed condition. The threshold amount may refer to a positive, non-zero amount, which may be a percent change, for example. As another example, the tip-in event may be confirmed responsive to an abrupt increase of the load demand.

If a tip-in event is not present, method 300 proceeds to 320 and includes opening (or maintaining open) the bypass valve and not activating the e-booster. Or, if the e-booster is currently activated, the method at 320 includes deactivating the e-booster. With the bypass valve open (e.g., fully open), induction air may flow to the turbocharger compressor without having first flowing through the e-booster. If the e-booster is currently deactivated, not activating the e-booster includes not supplying electric power to the electric motor so that the electrically drivable compressor is not driven by the electric motor and remains at rest, with a speed of zero. If the e-booster is currently activated, deactivating the e-booster includes stopping the supply of electric power to the electric motor so that the electrically drivable compressor spins down to rest.

At 322, method 300 includes providing the LP-EGR downstream of the e-booster and/or upstream of the e-booster. For example, with condensate formation not expected and the e-booster not used to provide additional boost pressure, the LP-EGR may be provided upstream of the e-booster and the fully open bypass valve, downstream of the e-booster and the fully open bypass valve, or both, as both positions provide LP-EGR upstream of the turbocharger compressor. Method 300 at 322 further includes adjusting the position of the downstream EGR valve and/or a position of the upstream EGR valve based on the desired engine dilution, as indicated at 324. For example, the controller may determine the desired engine dilution, as described above at 314, input the desired engine dilution into a look-up table or function, determine a first signal corresponding to a degree of opening to apply to the downstream EGR valve as a first output, and determine a second signal corresponding to a degree of opening to apply to the upstream EGR valve as a second output. In some examples, the second signal may correspond to a fully closed position of the upstream EGR valve while the first signal corresponds to a degree of opening for providing the entire engine dilution via the downstream EGR valve. In other examples, the first signal may correspond to a fully closed position of the downstream EGR valve while the second signal corresponds to the degree of opening for providing the entire engine dilution via the upstream EGR valve. In still other examples, both of the first signal and the second signal may correspond to partially open positions so that the combined openings of the downstream EGR valve and the upstream EGR valve produce the desired engine dilution. As one example of providing EGR both upstream of the e-booster and downstream of the e-booster, one of the upstream and downstream EGR valves may be opened to a fixed position to provide a fixed first portion of the total EGR, and the other of the upstream and downstream EGR valves may be continuously varied based on changes in the desired engine dilution to provide a variable second portion of the total EGR. Method 300 may then end.

Returning to 318, if a tip-in event is present, method 300 proceeds to 326 and includes closing (or maintaining closed) the bypass valve and activating the e-booster (or maintaining the e-booster active if currently activated) to provide auxiliary boost pressure via the e-booster. For example, during the tip-in event, the turbocharger compressor alone may not be able to provide a desired boost pressure, such as due to turbo lag resulting from a turbine of the turbocharger (e.g., turbine 7b of FIGS. 1 and 2) spinning up. Providing auxiliary boost pressure via the e-booster further includes fully opening the throttle upstream of the e-booster, as indicated at 328, and adjusting the e-booster compressor speed based on the desired boost pressure, as indicated at 330. For example, the bypass valve may be actuated to (or maintained in) the fully closed position so that all of the induction air flows through the e-booster before reaching the turbocharger. Simultaneously, the throttle upstream of the electrically drivable compressor may be actuated to the fully open position so that the throttle does not decrease the induction air pressure at the e-booster inlet. In alternate embodiments, the method at 328 may include partially opening the throttle upstream of the e-booster, where the amount of opening is based on the torque demand, or the additional boost demanded from the e-booster. Activating the e-booster includes operating the electrically drivable compressor at a non-zero desired speed via the electric motor using power drawn from the system battery, with the amount of power (or duty cycle of power) commanded to the electric motor based on the desired speed, the desired speed further based on the desired boost pressure to be supplied by the e-booster. For example, the controller may input the desired boost pressure into a look-up table or function to determine the desired electrically drivable compressor speed. The controller may then input the desired electrically drivable compressor speed into an additional look-up table or function to output the corresponding amount of power (or duty cycle of power) to provide to the electric motor to produce the desired boost pressure. For example, adjusting the e-booster compressor speed based on the desired boost pressure may include increasing the e-booster compressor speed as the desired boost pressure increases and decreasing the e-booster compressor speed as the desired boost pressure decreases. Furthermore, in some examples, once the turbocharger turbine spins up and is able to provide the desired boost pressure unassisted, the e-booster may be deactivated.

At 332, method 300 includes providing the LP-EGR upstream of the e-booster. By providing the LP-EGR upstream of the e-booster, the LP-EGR may mix with fresh induction air before being compressed by the electrically drivable compressor. Providing the LP-EGR upstream of the e-booster further includes adjusting the position of the upstream EGR valve based on the desired engine dilution, as indicated at 334. As an example, as the desired engine dilution increases, the opening of the upstream EGR valve may increase, and as the desired engine dilution decreases, the opening of the upstream EGR valve may decrease. Furthermore, the downstream EGR valve positioned may be maintained fully closed while LP-EGR is provided upstream of the e-booster. The controller may determine the desired engine dilution based on operating conditions, including engine load, engine speed, engine temperature, etc. For example, the controller may refer a look-up table having the engine speed and load as the input and a signal corresponding to a degree of opening to apply to the upstream EGR valve as the output, the degree of opening providing a dilution amount corresponding to the input engine speed-load. In still other examples, the controller may rely on a model that correlates the change in engine load with a change in the desired engine dilution and further correlates the change in the desired engine dilution with a change in the upstream EGR valve position. For example, as engine load increases from a low load to a mid load, the desired engine dilution may increase, and a larger upstream EGR valve opening may be requested. Then, as engine load increases from a mid load to a high load, the desired engine dilution may decrease, and a smaller upstream EGR valve opening may be requested. Method 300 may then end.

Therefore, FIG. 3 provides a method for operating a supercharged internal combustion engine of a type described above with respect to FIGS. 1 and 2 in which the electrically drivable compressor is operated, when the exhaust gas recirculation system is active, in order to introduce heat into the fresh air, the exhaust gas being recirculated via the second recirculation branch (e.g., second recirculation branch 4b) and the heated fresh air being introduced into the intake system at the second junction (e.g., second junction 4b'). Embodiments of the method are provided in which the bypass line of the electrically drivable compressor is shut off, by closing the shut-off element, when the electrically drivable compressor is operated. Embodiments of the method are provided in which the fresh air is compressed to ambient pressure $p_{atm}$ using the electrically drivable compressor, a fresh-air temperature realized as a result of compression being set using the compressor-specific throttle element.

It should be understood that method 300 of FIG. 3 may be repeated and/or run continuously such that operation of the e-booster and the LP-EGR system may be adjusted as operating conditions change. In this way, LP-EGR may be provided at an extended ambient temperature range that includes very low ambient temperatures (e.g., −8° C.), while condensate formation is reduced by utilizing the e-booster for induction air heating. By providing LP-EGR during a greater ambient temperature range, vehicle emissions may be reduced while fuel economy is increased. Furthermore, by using the e-booster to heat cold induction air, condensate-induced degradation of the turbocharger compressor may be avoided. Further still, turbo-lag may be reduced by using the e-booster as a fast-acting, auxiliary boosting device.

Next, FIG. 4 shows an example timeline 400 for adjusting operation of an electrically drivable compressor (e.g., electrically drivable compressor 8 of FIGS. 1 and 2) and an LP-EGR system (e.g., LP-EGR system 3 of FIGS. 1 and 2) based on operating conditions, such as according to the method of FIG. 3. Engine load is shown in plot 402, ambient temperature is shown in plot 404, a bypass valve position is shown in plot 406, electrically drivable compressor speed is shown in plot 408, throttle element position is shown in plot 410, downstream EGR valve position is shown in plot 412, and upstream EGR valve position is shown in plot 412. For all of the above, the horizontal axis represents time, with time increasing along the horizontal axis from left to right. The vertical axis represents each labeled parameter. For plots 402, 404, and 408, the value of the labeled parameter increases along the vertical axis from bottom to top. For plots 406, 410, 412, and 414, the position of each labeled parameter is shown from "closed" (e.g., fully closed) to "open" (e.g., fully open). Furthermore, a threshold ambient temperature is indicated by dashed line 416, below which condensate formation is expected at an inlet of a turbocharger turbine downstream of the electrically drivable compressor when LP-EGR is in use. Although the threshold ambient temperature is shown as a fixed value in the example of timeline 400, it should be understood that in other examples, the threshold ambient temperature may vary based on operating conditions (e.g., ambient humidity and/or an amount of EGR provided).

Prior to time t1, the engine is operating with a relatively low engine load (plot 402). The ambient temperature (plot 404) is greater than the threshold temperature (dashed line 416). Thus, condensate formation at the inlet of the turbocharger turbine is not expected. Furthermore, a tip-in event is not present, and so the electrically drivable compressor is not activated, with a compressor speed of zero (plot 408). Because the electrically drivable compressor is not utilized, the bypass valve, which is positioned in a bypass line of the electrically drivable compressor (e.g., shut-off element 9c shown in FIGS. 1 and 2) is fully closed (plot 406) so that intake air does not flow through the electrically drivable compressor before reaching the turbocharger compressor. In the example of timeline 400, the throttle element, which is positioned upstream of the electrically drivable compressor (e.g., throttle element 8a of FIGS. 1 and 2) is fully closed (plot 410). Furthermore, LP-EGR is provided both upstream and downstream of the electrically drivable compressor (e.g., via both first recirculation branch 4a and second recirculation branch 4b of FIGS. 1 and 2). The upstream EGR valve (e.g., EGR valve 4a" of FIGS. 1 and 2) is held in a fixed partially open position to provide a first portion of the LP-EGR (plot 414). And opening of the downstream EGR valve (e.g., EGR valve 4b" of FIGS. 1 and 2) is varied as the engine load, and therefore the desired engine dilution, varies (plot 412). However, in other examples, both of the upstream EGR valve and the downstream EGR valve may be actively varied with the engine load, the downstream EGR valve may be held in a fixed partially open position while the position of the upstream EGR valve is actively varied, or the EGR may be provided only via the upstream EGR valve or the downstream EGR valve.

At time t1, the ambient temperature (plot 404) decreases below the threshold ambient temperature (dashed line 416). In response, the bypass valve is actuated to the fully closed position (plot 406) so that intake air is directed to the inlet of the electrically drivable compressor for heating via the electrically drivable compressor. Additionally, the electrically drivable compressor is activated, such as by supplying electric power to a motor driving the electrically drivable compressor, to spin up the electrically drivable compressor to a non-zero speed (plot 408). Further, the upstream EGR valve is adjusted to the fully closed position (plot 414) so that LP-EGR is not provided upstream of the electrically drivable compressor. Instead, the downstream EGR valve is further opened (plot 412), with an amount of further opening corresponding to an amount of closing of the upstream EGR valve, in order to provide all of the requested EGR via the downstream EGR valve. Further still, the throttle element upstream of the electrically drivable compressor is adjusted to a partially open position (plot 410), the partially open position adjusted based on a desired amount of heat output by the electrically drivable compressor to reduce condensate formation downstream of the electrically drivable compressor and upstream of the turbocharger compressor.

At time t2, the ambient temperature (plot 404) increases above the threshold ambient temperature (dashed line 416). Furthermore, a tip-in event is not present. In response, the electrically drivable compressor is deactivated, such as by stopping the supply of electric power to the motor driving the electrically drivable compressor, and the electrically drivable compressor spins down to rest (plot 408). Furthermore, the bypass valve and the throttle element are both fully closed (plots 406 and 410, respectively) so that intake air flows directly to the turbocharger inlet and bypasses the deactivated electrically drivable turbocharger. Further still, LP-EGR is provided through a combination of the upstream and downstream positions between time t2 and time t3. The upstream EGR valve is held at a fixed partially open position (plot 414), and the position of the downstream EGR valve (plot 412) is adjusted responsive to engine load.

Shortly before time t3, the engine load (plot 402) begins to rapidly increase due to a tip-in event. Responsive to the tip-in event, at time t3, the electrically drivable compressor is activated to transiently provide boost pressure while the turbocharger spins up. Therefore, at time t3, the bypass valve is actuated to the fully closed position (plot 406) so that the intake air is directed to the inlet of the electrically drivable compressor, the throttle element is actuated to the fully open position (plot 410) so that airflow through the electrically drivable compressor is unrestricted, and electric power is supplied to the electric motor driving the electrically drivable compressor so that the electrically drivable compressor is quickly spun up to a non-zero speed (plot 408). As described above with respect to FIG. 3, the non-zero speed may be determined based on the desired boost pressure. Furthermore, all of the LP-EGR is supplied upstream of the e-booster. As such, the downstream EGR valve is fully closed (plot 412), and the upstream EGR valve is further opened (plot 414), with the degree of further opening of the upstream EGR valve corresponding to the amount of closing of the downstream EGR valve. Between time t3 and time t4, as the LP-EGR is provided via the upstream EGR valve, the position of the upstream EGR valve is adjusted as the engine load changes.

At time t4, the tip-in event is no longer present, and the turbocharger turbine has reached a desired speed for providing the desired boost pressure (not shown). Furthermore, the ambient temperature (plot 404) remains above the threshold ambient temperature (dashed line 416). In response, the electrically drivable compressor is deactivated, such as by stopping the supply of electric power to the motor driving the electrically drivable compressor, and the electrically drivable compressor spins down to rest (plot 408). Furthermore, the bypass valve and the throttle element are both fully closed (plots 406 and 410, respectively) so that intake air flows directly to the turbocharger inlet and bypasses the deactivated electrically drivable turbocharger. Further still, LP-EGR is provided through a combination of the upstream and downstream positions after time t4. The upstream EGR valve is held at a fixed partially open position (plot 414), and the position of the downstream EGR valve (plot 412) is adjusted responsive to engine load. Furthermore, due to the higher engine load (plot 402), the amount of EGR provided is less than when the engine load was lower, such as prior to time t1.

In this way, an electrically drivable compressor may be used to provide heated intake air in an engine system and/or boost pressure. In particular, by providing heated intake air downstream of the electrically drivable compressor and upstream of a turbocharger compressor, LP-EGR may be delivered at an inlet of the turbocharger compressor during low ambient temperatures with reduced condensate formation at the inlet of the turbocharger compressor. By providing LP-EGR during low ambient temperatures, vehicle emissions may be reduced while engine efficiency is increased. Furthermore, by reducing condensate formation at the inlet of the turbocharger compressor, degradation of the turbocharger compressor due to condensate droplets may be reduced. Further still, by providing boost pressure via the electrically drivable compressor, turbo-lag may be reduced, thereby increasing a transient response of the engine system.

The technical effect of using an electrically drivable compressor arranged upstream of a turbocharger compressor to provide heated intake air downstream of the electrically drivable compressor is that low-pressure exhaust gas recirculation may be used at lower ambient temperatures with reduced condensate formation at an inlet of the turbocharger compressor.

As one example, a supercharged internal combustion engine comprises: an intake system for the supply of charge air; an exhaust gas discharge system for the discharge of exhaust gas; a turbocharger, including a turbine arranged in the exhaust gas discharge system and a compressor arranged in the intake system; an electrically drivable compressor arranged in the intake system upstream of the compressor of the turbocharger; a compressor-specific throttle element is arranged upstream of the electrically drivable compressor; a bypass line for bypassing said electrically drivable compressor that branches off from the intake system upstream of the electrically drivable compressor, forming a third junction, and opens into the intake system between the electrically drivable compressor and the compressor of the turbocharger, forming a fourth junction; a shut-off element arranged in the bypass line; and an exhaust gas recirculation system, comprising a recirculation line which branches off from the exhaust gas discharge system downstream of the turbine of the turbocharger, the recirculation line bifurcating into a first recirculation branch that includes a first EGR valve and opens into the intake system upstream of the third junction, forming a first junction, and a second recirculation branch that includes a second EGR valve and opens into the intake system between the fourth junction and the compressor of the turbocharger, forming a second junction. In the preceding example, additionally or optionally, the compressor-specific throttle element is arranged between the first junction and the electrically drivable compressor. In any or all of the preceding examples, additionally or optionally, the compressor-specific throttle element is arranged between the third junction and the electrically drivable compressor. In any or all of the preceding examples, additionally or optionally, the compressor-specific throttle element is a pivotable flap. In any or all of the preceding examples, the supercharged internal combustion engine additionally or optionally further comprises a cooler arranged in the recirculation line. In any or all of the preceding examples, additionally or optionally, the first and second EGR valves are arranged downstream of the cooler and are arranged at the first junction and the second junction, respectively. In any or all of the preceding examples, the supercharged internal combustion engine additionally or optionally further comprises a bypass line for the cooler. In any or all of the preceding examples, the supercharged internal combustion engine additionally or optionally further comprises an exhaust gas after-treatment system arranged in the exhaust gas discharge system between the turbine of the turbocharger and the exhaust gas recirculation system, the exhaust gas after-treatment system including a particle filter, and a charge-air cooler arranged in the intake system downstream of the compressor of the turbocharger.

In another example, a method comprises: operating an electrically drivable compressor to provide heated induction air responsive to a determination of expected condensate formation downstream of the electrically drivable compressor and upstream of a turbocharger compressor; and operating the electrically drivable compressor to provide auxiliary boost pressure in response to a tip-in event. In the preceding example, additionally or optionally, the determination of the expected condensate formation downstream of the electrically drivable compressor and upstream of the turbocharger compressor is based on at least one of an ambient temperature, an ambient humidity, and an amount of low-pressure exhaust gas recirculation provided downstream of the electrically drivable compressor and upstream of the turbocharger compressor. In any or all of the preceding examples, additionally or optionally, operating the electrically drivable compressor to provide heated induction air comprises: fully closing a shut-off element in a passage bypassing the electrically drivable compressor; spinning the electrically drivable compressor at a non-zero speed via an electric motor; and adjusting a throttle element positioned upstream of the electrically drivable compressor based on a desired temperature of the heated induction air and a desired pressure downstream of the electrically drivable compressor. In any or all of the preceding examples, additionally or optionally, the desired temperature of the heated induction air is determined based on at least one of the ambient temperature, the ambient humidity, and the amount of low-pressure exhaust gas recirculation provided downstream of the electrically drivable compressor and upstream of the turbocharger compressor. In any or all of the preceding examples, additionally or optionally, the desired pressure downstream of the electrically drivable compressor is equal to ambient pressure. In any or all of the preceding examples, additionally or optionally, operating the electrically drivable compressor to provide auxiliary boost pressure in response to the tip-in event comprises: fully closing a shut-off element in a passage bypassing the electrically drivable compressor; fully opening a throttle element positioned upstream of the electrically drivable compressor; spinning the electrically drivable compressor at a non-zero speed via an electric motor; and adjusting the non-zero speed based on a desired pressure downstream of the electrically drivable compressor. In any or all of the preceding examples, the method additionally or optionally further comprises, during the operating the electrically drivable compressor to provide heated induction air, providing low-pressure exhaust gas recirculation (LP-EGR) downstream of the electrically drivable compressor and not upstream of the electrically drivable compressor; during the operating the electrically drivable compressor to provide auxiliary boost pressure, providing the LP-EGR upstream of the electrically drivable compressor and not downstream of the electrically drivable compressor; and while the electrically drivable compressor is not operated, providing the LP-EGR downstream and/or upstream of the electrically drivable compressor. In any or all of the preceding examples, additionally or optionally, an amount of LP-EGR provided upstream of the electrically drivable compressor is adjusted by adjusting a position of a first EGR valve positioned upstream of the electrically drivable compressor, and an amount of LP-EGR provided downstream of the electrically drivable compressor is adjusted by adjusting a position of a second EGR valve positioned downstream of the electrically drivable compressor.

As another example, a system comprises: an engine coupled to an intake system for receiving charge air and an exhaust system for discharging exhaust gases; a compound boosting system including an electrically driven compressor and a turbocharger compressor driven by an exhaust turbine, the turbocharger compressor positioned downstream of the electrically driven compressor in the intake system; a throttle arranged at an inlet of the electrically driven compressor; an exhaust gas recirculation (EGR) system that couples the exhaust system downstream of the exhaust turbine to the intake system upstream of the electrically driven compressor via a first recirculation branch and between the e-booster compressor and the turbocharger compressor via a second recirculation branch; and a controller storing executable instructions in non-transitory memory that, when executed, cause the controller to: activate the electrically driven compressor and provide recirculated exhaust gas via the second recirculation branch in response to expected condensate formation at an inlet of the turbocharger compressor; activate the electrically driven compressor and provide recirculated exhaust gas via the first recirculation branch in response to a tip-in event; and deactivate the electrically driven compressor and provide recirculated exhaust gas via one or both of the first recirculation branch and the second recirculation branch in response to no expected condensate formation at the inlet of the turbocharger compressor and an absence of the tip-in event. In the preceding example, the system additionally or optionally further comprises a first EGR valve positioned at a junction of the first recirculation branch and the intake system and a second EGR valve positioned at a junction of the second recirculation branch and the intake system, and wherein: the first EGR valve is fully closed and the second EGR valve is at least partially open to provide recirculated exhaust gas via the second recirculation branch; the first EGR valve is at least partially opened and the second EGR valve is fully closed to provide recirculated exhaust gas via the first recirculation branch; and the first EGR valve and the second EGR valve are both at least partially open to provide recirculated exhaust gas via both of the first recirculation branch and the second recirculation branch. In any or all of the preceding examples, the system additionally or optionally further comprises a bypass line, including a bypass valve, coupled across the electrically driven compressor, and wherein the instructions that cause the controller to activate the electrically driven compressor and provide recirculated exhaust gas via the second recirculation branch in response to expected condensate formation at the inlet of the turbocharger compressor include further instructions stored in non-transitory memory that, when executed, cause the controller to: fully close the bypass valve in the bypass line coupled across the electrically driven compressor; supply electrical power from a system battery to an electric motor to drive the electrically driven compressor at a first desired speed; and adjust a position of the throttle arranged at the inlet of the electrically driven compressor based on a desired intake air temperature at an outlet of the electrically driven compressor and a first desired pressure at the outlet of the electrically driven compressor, the desired intake air temperature at the outlet of the electrically driven compressor based on an ambient temperature measured by an ambient temperature sensor and an amount of the recirculated exhaust gas provided via the second recirculation branch. In any or all of the preceding examples, additionally or optionally, the instructions that cause the controller to activate the electrically driven compressor and provide recirculated exhaust gas via the first recirculation branch in response to the tip-in event include further instructions stored in non-transitory memory that, when executed, cause the controller to: fully close the bypass valve in the bypass line coupled across the electrically driven compressor; fully open the throttle arranged at the inlet of the electrically driven compressor; and supply electrical power from the system battery to the electric motor to drive the electrically driven compressor at a second desired speed, the second desired speed adjusted based on a second desired pressure at the outlet of the electrically driven compressor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A supercharged internal combustion engine, comprising:
   an intake system for the supply of charge air;
   an exhaust gas discharge system for the discharge of exhaust gas;
   a turbocharger, including a turbine arranged in the exhaust gas discharge system and a compressor arranged in the intake system;
   an electrically drivable compressor arranged in the intake system upstream of the compressor of the turbocharger;
   a compressor-specific throttle element is arranged upstream of the electrically drivable compressor;
   a bypass line for bypassing said electrically drivable compressor that branches off from the intake system upstream of the electrically drivable compressor, forming a third junction, and opens into the intake system between the electrically drivable compressor and the compressor of the turbocharger, forming a fourth junction;
   a shut-off element arranged in the bypass line; and
   an exhaust gas recirculation system, comprising a recirculation line which branches off from the exhaust gas discharge system downstream of the turbine of the turbocharger, the recirculation line bifurcating into a first recirculation branch that includes a first EGR valve and opens into the intake system upstream of the third junction, forming a first junction, and a second recirculation branch that includes a second EGR valve and opens into the intake system between the fourth junction and the compressor of the turbocharger, forming a second junction.

2. The supercharged internal combustion engine as claimed in claim 1, wherein the compressor-specific throttle element is arranged between the first junction and the electrically drivable compressor.

3. The supercharged internal combustion engine as claimed in claim 1, wherein the compressor-specific throttle element is arranged between the third junction and the electrically drivable compressor.

4. The supercharged internal combustion engine as claimed in claim 1, wherein the compressor-specific throttle element is a pivotable flap.

5. The supercharged internal combustion engine as claimed claim 1, further comprising a cooler arranged in the recirculation line.

6. The supercharged internal combustion engine as claimed in claim 5, wherein the first and second EGR valves are arranged downstream of the cooler and are arranged at the first junction and the second junction, respectively.

7. The supercharged internal combustion engine as claimed in claim 5, further comprising a bypass line for the cooler.

8. The supercharged internal combustion engine as claimed in claim 1, further comprising an exhaust gas after-treatment system arranged in the exhaust gas discharge system between the turbine of the turbocharger and the exhaust gas recirculation system, the exhaust gas after-treatment system including a particle filter, and a charge-air cooler arranged in the intake system downstream of the compressor of the turbocharger.

9. A method, comprising:
   operating an electrically drivable compressor to provide heated induction air responsive to a determination of expected condensate formation downstream of the electrically drivable compressor and upstream of a turbocharger compressor; and
   operating the electrically drivable compressor to provide auxiliary boost pressure in response to a tip-in event.

10. The method of claim 9, wherein the determination of the expected condensate formation downstream of the electrically drivable compressor and upstream of the turbocharger compressor is based on at least one of an ambient temperature, an ambient humidity, and an amount of low-pressure exhaust gas recirculation provided downstream of the electrically drivable compressor and upstream of the turbocharger compressor.

11. The method of claim 10, wherein operating the electrically drivable compressor to provide heated induction air comprises:
   fully closing a shut-off element in a passage bypassing the electrically drivable compressor;
   spinning the electrically drivable compressor at a non-zero speed via an electric motor; and
   adjusting a throttle element positioned upstream of the electrically drivable compressor based on a desired temperature of the heated induction air and a desired pressure downstream of the electrically drivable compressor.

12. The method of claim 11, wherein the desired temperature of the heated induction air is determined based on at least one of the ambient temperature, the ambient humidity, and the amount of low-pressure exhaust gas recirculation provided downstream of the electrically drivable compressor and upstream of the turbocharger compressor.

13. The method of claim 11, wherein the desired pressure downstream of the electrically drivable compressor is equal to ambient pressure.

14. The method of claim 9, wherein operating the electrically drivable compressor to provide auxiliary boost pressure in response to the tip-in event comprises:
fully closing a shut-off element in a passage bypassing the electrically drivable compressor;
fully opening a throttle element positioned upstream of the electrically drivable compressor;
spinning the electrically drivable compressor at a non-zero speed via an electric motor; and
adjusting the non-zero speed based on a desired pressure downstream of the electrically drivable compressor.

15. The method of claim 9, further comprising:
during the operating the electrically drivable compressor to provide heated induction air, providing low-pressure exhaust gas recirculation (LP-EGR) downstream of the electrically drivable compressor and not upstream of the electrically drivable compressor;
during the operating the electrically drivable compressor to provide auxiliary boost pressure, providing the LP-EGR upstream of the electrically drivable compressor and not downstream of the electrically drivable compressor; and
while the electrically drivable compressor is not operated, providing the LP-EGR downstream and/or upstream of the electrically drivable compressor.

16. The method of claim 15, wherein an amount of LP-EGR provided upstream of the electrically drivable compressor is adjusted by adjusting a position of a first EGR valve positioned upstream of the electrically drivable compressor, and an amount of LP-EGR provided downstream of the electrically drivable compressor is adjusted by adjusting a position of a second EGR valve positioned downstream of the electrically drivable compressor.

17. A system, comprising:
an engine coupled to an intake system for receiving charge air and an exhaust system for discharging exhaust gases;
a compound boosting system including an electrically driven compressor and a turbocharger compressor driven by an exhaust turbine, the turbocharger compressor positioned downstream of the electrically driven compressor in the intake system;
a throttle arranged at an inlet of the electrically driven compressor;
an exhaust gas recirculation (EGR) system that couples the exhaust system downstream of the exhaust turbine to the intake system upstream of the electrically driven compressor via a first recirculation branch and between the electrically driven compressor and the turbocharger compressor via a second recirculation branch; and
a controller storing executable instructions in non-transitory memory that, when executed, cause the controller to:
activate the electrically driven compressor and provide recirculated exhaust gas via the second recirculation branch in response to expected condensate formation at an inlet of the turbocharger compressor;
activate the electrically driven compressor and provide recirculated exhaust gas via the first recirculation branch in response to a tip-in event; and
deactivate the electrically driven compressor and provide recirculated exhaust gas via one or both of the first recirculation branch and the second recirculation branch in response to no expected condensate formation at the inlet of the turbocharger compressor and an absence of the tip-in event.

18. The system of claim 17, further comprising a first EGR valve positioned at a junction of the first recirculation branch and the intake system and a second EGR valve positioned at a junction of the second recirculation branch and the intake system, and wherein:
the first EGR valve is fully closed and the second EGR valve is at least partially open to provide recirculated exhaust gas via the second recirculation branch;
the first EGR valve is at least partially opened and the second EGR valve is fully closed to provide recirculated exhaust gas via the first recirculation branch; and
the first EGR valve and the second EGR valve are both at least partially open to provide recirculated exhaust gas via both of the first recirculation branch and the second recirculation branch.

19. The system of claim 17, further comprising a bypass line, including a bypass valve, coupled across the electrically driven compressor, and wherein the instructions that cause the controller to activate the electrically driven compressor and provide recirculated exhaust gas via the second recirculation branch in response to expected condensate formation at the inlet of the turbocharger compressor include further instructions stored in non-transitory memory that, when executed, cause the controller to:
fully close the bypass valve in the bypass line coupled across the electrically driven compressor;
supply electrical power from a system battery to an electric motor to drive the electrically driven compressor at a desired speed; and
adjust a position of the throttle arranged at the inlet of the electrically driven compressor based on a desired intake air temperature at an outlet of the electrically driven compressor and a desired pressure at the outlet of the electrically driven compressor, the desired intake air temperature at the outlet of the electrically driven compressor based on an ambient temperature measured by an ambient temperature sensor and an amount of the recirculated exhaust gas provided via the second recirculation branch.

20. The system of claim 19, wherein the instructions that cause the controller to activate the electrically driven compressor and provide recirculated exhaust gas via the first recirculation branch in response to the tip-in event include further instructions stored in non-transitory memory that, when executed, cause the controller to:
fully close the bypass valve in the bypass line coupled across the electrically driven compressor;
fully open the throttle arranged at the inlet of the electrically driven compressor; and
supply electrical power from the system battery to the electric motor to drive the electrically driven compressor at a second desired speed, the second desired speed adjusted based on a second desired pressure at the outlet of the electrically driven compressor.

* * * * *